Patented May 15, 1945

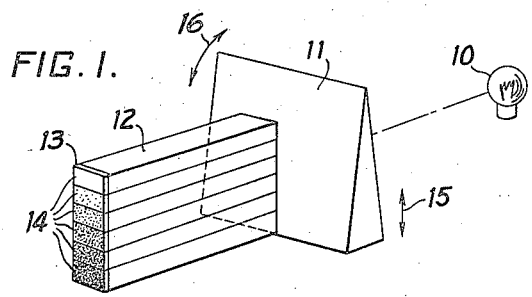
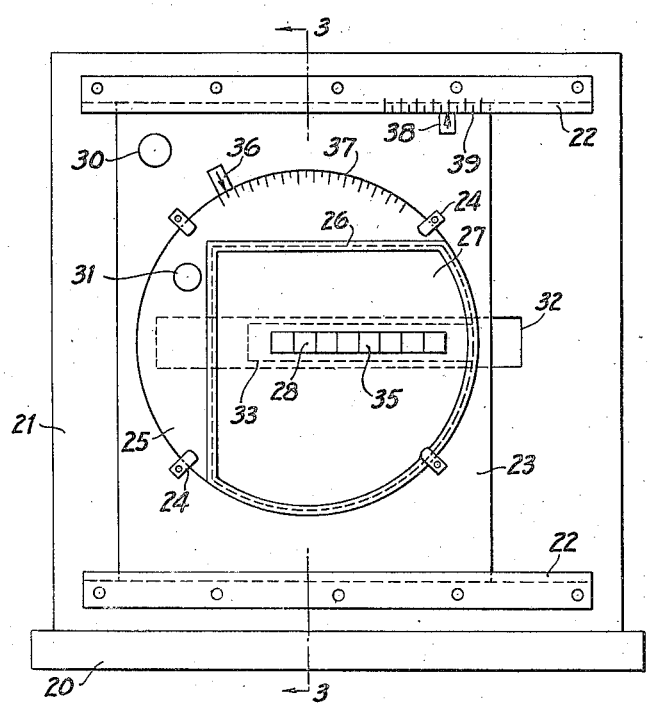
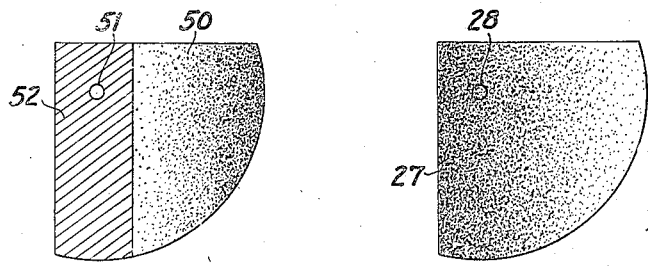

2,376,166

UNITED STATES PATENT OFFICE 2,376,166

SENSITOMETRY

Oran E. Miller, Rochester, N. Y., assignor to Eastman Kodak Company, Rochester, N. Y., a corporation of New Jersey Application June 5, 1942, Serial No. 445,877

6 Claims. (Cl. 88—14)

This invention relates specifically to devices for producing stepped intensity light beams. Such devices are used in sensitometry for exposing test strips of photosensitive material and are also used in some forms of densitometry for measuring sensitometric strips.

Reference is made to patent application 418,052, filed November 6, 1941, now U. S. Patent 2,326,007 in which Capstaff teaches the combination of a density wedge and a pile of integrating plates for this same general purpose. The present invention from one point of view may be considered as an improved form of one of the instruments developed by Capstaff and described in that application.

It is an object of the present invention to provide a device for producing a stepped intensity light beam, specifically one in which the gradient of the light beam is variable.

It is also an object of the invention to produce a device of this type which is compact, rugged, easy to operate and which maintains fidelity of adjustment under all normal handling. It is an object of a preferred embodiment of the invention to reduce any detrimental effects caused in such device by the use of an extended light source. In this preferred embodiment the light source may be extended over a considerable area without materially affecting the accuracy of the instrument.

According to the present invention a device for producing a stepped intensity light beam consists of a light source and a linear series of integrating tubes which may be in contact with one another or very slightly spaced and which all face approximately toward the light source so that the light passes through the tubes. The pile or series of tubes may be provided with light diffusing surfaces or layers over either or both ends. A light filter of continuously and linearly graded density is movably mounted between the source and the integrating tubes. This is all according to Capstaff's invention, mentioned above, and according to Capstaff the gradient across the beam may be varied by moving the wedge exially toward or away from the light source. In the present invention the wedge remains in its own plane at all times and is preferably immediately adjacent to the ends of the tubes so that the area of the light source does not have as much effect as it does when the wedge is either near the source or at a variable distance therefrom.

According to the present invention, means are provided for rotating the filter in its own plane to vary the gradation of intensity across the beam entering and leaving the tubes. To vary the overall intensity of the beam or the intensity at any one step thereof without varying the gradient, means are provided for moving the filter still in its own plane but transversely in a direction parallel to the series of tubes, that is, in a straight line from one tube to the next. Scale means provided to measure the amount of this transverse movement can in a densitometer be used as a measure of the film speed of the sensitometer strip being tested. Still more important, a scale measuring the angular displacement or setting of the wedge is a measure of the gradient across the light beam, and hence, in a densitometer, is a measure of the gamma.

When the scales are calibrated to read film speed and gamma directly, the point about which the filter rotates has some effect on the readings. If the axis of rotation passes through the filter itself at some particular density, the speed measurements are those for that film density independent of the gamma setting. It is well known that for inertia speed (Hurter and Driffield) the density at which speed is measured should be the "fog" density. For astronomical speed the density should be 1. Other systems of measuring film speed use other critical densities such as a density of .1 above fog.

Of course, the axis of rotation may not actually pass through the filter itself, but may be considered as passing through a point of the filter extrapolated. For example, the filter may fall off in density from 2 to .1 at the lower density edge and the axis of rotation may be beyond this lower density edge at a point which would correspond to zero density if the filter were extended to that point. This is considered as the filter density extrapolated. For convenience in manufacture and in use, the axis of rotation may also pass through one of the integrating tubes. Generally speaking, the filter is in a plane at right angles to the axis of each of the tubes, which may be circular or rectangular in cross section, but this orientation need only be approximate. When the axis of rotation passes through one of the integrating tubes, the density corresponding to this tube does not vary as the filter is rotated, but of course the axis shifts from one tube to another as the filter is moved transversely (e. g. for speed measurements).

The invention will be fully understood from the following description when read in connection with the accompanying drawing in which:

Fig. 1 illustrates the principle of the invention.

Figs. 2 and 3 are respectively a front view and a side elevation in cross section of a preferred method of mounting a filter according to the present invention.

Figs. 4 and 5 illustrate two forms which the filter used in Figs. 2 and 3 may have.

Fig. 6 shows a gammameter incorporating the present invention.

In Fig. 1 light from a source 10 passes through a density filter 11 having linearly graded density shown for convenience as a variation in physical thickness. In practice density wedges made photographically or by depositing thin metallic layers are of substantially uniform thickness but have a graded density corresponding to the wedge 11. Light from the source after emerging from filter 11 passes through a series 12 of integrating tubes which in the form illustrated consists of a pile of rectangular glass tubes. Either or both ends of each tube may be provided with a diffusing layer 13 and the exits of the tubes form a series of steps 14 in which the intensity of the beam is uniform in each step but is graded from step to step. Transverse movement of the filter 11 as illustrated by the double headed arrow 15 causes the overall intensity of each step of the emerging beam to vary, but the gradation from step to step remains constant. According to the present invention, the filter 11 is mounted to be rotatable in its own plane as indicated by the double headed arrow 16. This movement varies the gradation across the light beam without varying the density at that point about which the rotation takes place. This last statement refers to the case where the axis of rotation passes through one of the tubes, but the axis of rotation may be to one side of the series of tubes in which case the density at each step varies with each rotation, but in any film speed measurements made by transverse adjustment, the speed is with reference to the density at the part of the filter through which the axis of rotation passes. These theoretical considerations as to the densities to which the speed measurements refer neglect all densities other than those of the filter either in the comparison beam of the densitometer or the test beam illuminating the sensitometer strip used. Any additional uniform density in the comparison beam adds to the filter density, and contrariwise any additional density in the test strip beam should be subtracted from the filter density in determining the density at which the film speed measurements are specifically taken.

In Figs. 2 and 3 a base 20 is provided with an upright support 21 carrying two bars 22 in which a plate 23 may be moved transversely. This plate 23 by means of lugs 24 carries a disk 25 which may be rotated at least through an angle somewhat less than 90°. This disk in turn, by means of a bar 26 carries a continuously and linearly graded density filter 27 to be rotatable with the disk. In the drawing the axis of rotation is indicated by the point 28, Fig. 4 showing the details of the filter somewhat more clearly.

Knobs 30 and 31 respectively on the plate 23 and the disk 25 permit easy adjustments of these elements. A rectangular aperture 32 in the support 21 and a corresponding aperture 33 in the plate 23 permit light to pass through the filter 27 and into a series of integrating tubes 35 only part of which is shown. It will be noted that in this embodiment, the axis 28 of rotation passes through one of the tubes 35 and transverse adjustment of the plate 23 determines which of the tubes is so honored. As shown in Fig. 4 the density of the filter is linearly graded so that when it is oriented as shown in Fig. 2, the gradation across the light beam emerging from the series of tubes is a maximum. As the disk 25 and filter 27 are rotated about the point 28 the intensity gradation falls off until it is zero at which time the same density of the filter is opposite each of the tubes. It will be noted that the full gamma or contrast scale is provided by a 90° rotation of the filter. Since very low gradations are not of interest, the total rotation may be somewhat less than 90°. The disk 25 is provided with an angular scale 37 to be read against an index 36 carried on the plate 23. This angular scale is preferably calibrated directly in photographic gamma so that the instrument can be used as a gammameter described in more detail in connection with Fig. 6. Similarly, the plate 23 is provided with an index 38 to read against a scale 39 ruled on one of the bars 22 to read the transverse adjustment of the filter. This may be calibrated directly in film speeds which, of course, correspond to the density of the filter at the point 28.

If the film speed is wanted at some other density, zero say, it would be better to have the scale 39 calibrated in arbitrary units and to have a comparison table or chart converting these units to the film speed, the gamma as measured by the scale 37 being taken into account.

Alternatively, a filter 50 may be used, a portion of which is covered by a shield 52 and which is arranged so that the axis of rotation 51 passes through a point corresponding to zero or fog density or .1 above fog, of the filter 50. That is, the actual filter may have a definite density at its low density edge, but if it were extended with the same uniform gradient it would be zero density or one of the above mentioned densities at the point 51. While this latter form permits the scale 39 to be calibrated in inertia speeds say, it is in some cases of less practical use than the form illustrated in Fig. 4 because the sensitometer strips are printed for the higher densities only.

The gamma meter illustrated in Fig. 6 consists of a light source 40 from which light passes through a filter 41 and a series or pile of integrating tubes 42 to give a stepped intensity light beam corresponding to the invention to be viewed by the eye 43 of an observer. A test beam reflected by reflecting surfaces 44, 45 and 46 comes from the same source 40 and passes through a sensitometer strip 47 which is shown end on to be viewed by the same eye 43. The strip 47 may be compared directly with the comparison beam emerging from the beam 42, which beam may be adjusted for overall intensity and for gradation in accordance with the present invention.

Since the filter remains in its own plane for all adjustments thereof, the gammameter and densitometer can be made compact and rugged so as to maintain fidelity of adjustment. As pointed out above, this filter is preferably quite near the entrance of the series of integrating tubes.

Having thus described the preferred embodiment of my invention, I wish to point out that it is not limited to this particular structure but is of the scope of the appended claims.

I claim:

1. A device for producing a stepped intensity light beam comprising a light source, a linear series of integrating tubes narrow in both transverse dimensions and pointing approximately toward the light source, a light filter filtering the light between the source and the tubes which filter is an optical wedge having a continuously graded density and means for rotating the filter in its own plane to vary the gradation of intensity across said beam emerging from the tubes.

2. A device according to claim 1 including means for transversely moving the filter in its own plane in a direction parallel to said linear series.

3. A device according to claim 1 in which the filter is close to the ends of the tubes.

4. A device according to claim 1 in which the rotation is about an axis in the plane of the series of tubes.

5. A device for producing a stepped intensity light beam comprising a light source, a linear series of intgerating tubes pointing approximately toward the light source, a light filter filtering the light between the source and the tubes which filter has a density graded both radially and circumferentially and means for rotating the filter in its own plane to vary the gradation of intensity across said beam emerging from the tubes.

6. A gammameter comprising a device for producing a stepped intensity light beam which device includes a linear series of intgerating tubes narrow in both transverse dimensions and pointing approximately toward a light source and an optical wedge filter rotatable in its own plane between the source and the tubes to vary the gradation of intensity across the light beam emerging from the tubes, means for rotating the filter and scale means reading directly in gammas, carried by said rotating means for indicating the angular setting of the filter.

ORAN E. MILLER.